Figure 1:
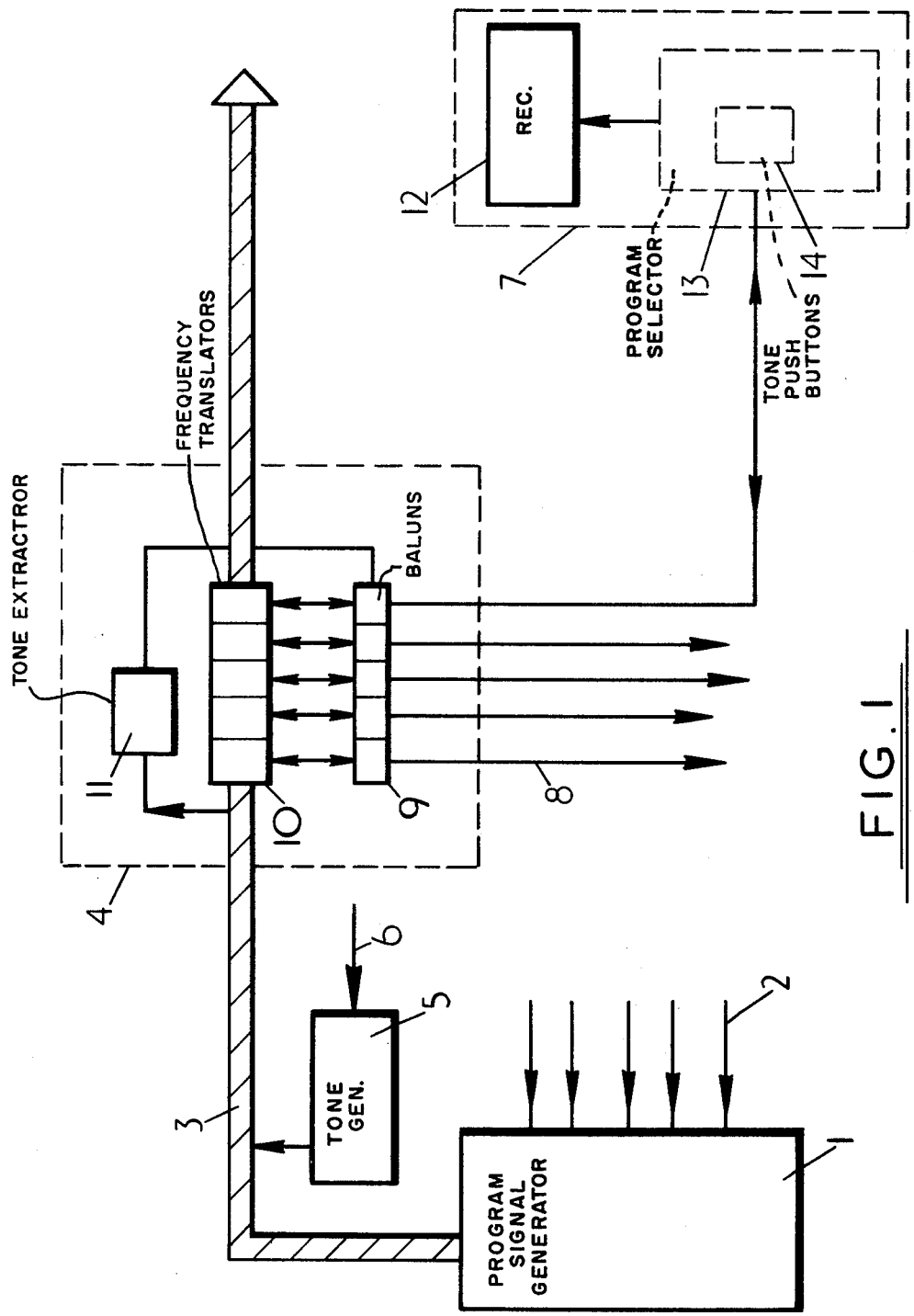

United States Patent [19]

Gargini

[11] 4,064,460
[45] Dec. 20, 1977

[54] COAXIAL WIRED BROADCASTING SYSTEM WITH TONE RESPONSIVE PROGRAM SELECTORS

[75] Inventor: Eric John West Gargini, Drayton, England

[73] Assignee: Communications Patents Limited, Kingston-upon-Thames, Great Britain

[21] Appl. No.: 711,463

[22] Filed: Aug. 4, 1976

Related U.S. Application Data

[63] Continuation-in-part of Ser. No. 557,911, March 13, 1975, abandoned.

[30] Foreign Application Priority Data

Mar. 16, 1974 United Kingdom ............... 11791/74

[51] Int. Cl.² .................................... H04B 3/10
[52] U.S. Cl. ...................... 325/308; 358/86
[58] Field of Search ............... 325/308, 309; 358/86, 358/114, 84

[56] References Cited

U.S. PATENT DOCUMENTS

| | | | |
|---|---|---|---|
| 3,665,311 | 5/1972 | Gargini | 325/308 |
| 3,693,090 | 9/1972 | Gabriel | 325/308 |
| 3,801,735 | 4/1974 | Gabriel | 325/308 |
| 3,889,050 | 6/1975 | Thompson | 325/308 |
| 3,898,374 | 8/1975 | Gargini | 325/308 |
| 3,935,534 | 1/1976 | Lewis | 325/308 |

*Primary Examiner*—Benedict V. Safourek
*Assistant Examiner*—Jin F. Ng
*Attorney, Agent, or Firm*—Laurence R. Brown

[57] ABSTRACT

A wired broadcasting system is provided which comprises a wideband coaxial cable for carrying multi-channel programme signals from at least one programme source to a plurality of exchanges to each of which a plurality of subscriber units are connected. The programme source provides signals on the cable stacked one upon the other in frequency. Each exchange comprises in respect of each subscriber a switchable frequency translator for selectively translating any one of the said stacked frequency signals to a predetermined other frequency which the subscriber unit is adapted to receive, switching means controllable from the respective subscriber unit to selectively switch the frequency translator, and an output circuit arranged to apply the said predetermined other frequency signal to a feeder cable to which the subscriber is connected.

5 Claims, 5 Drawing Figures

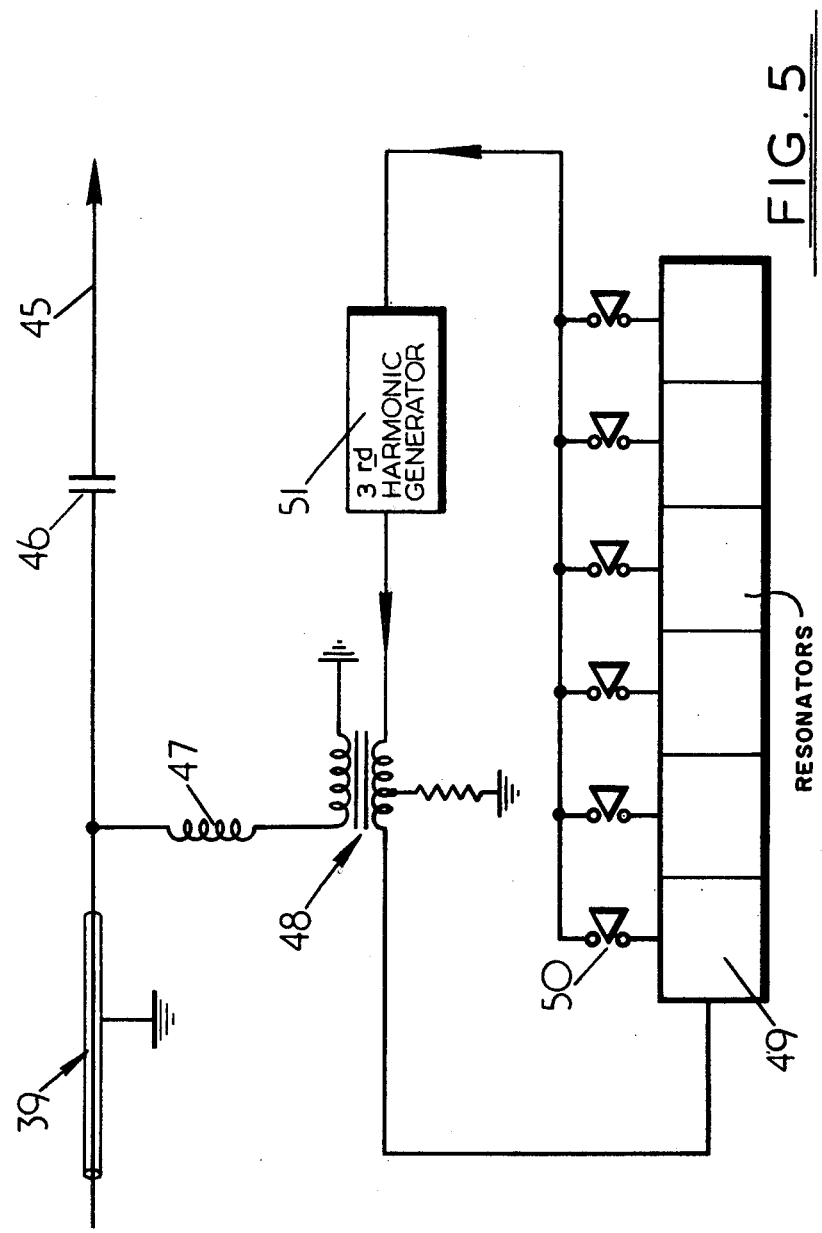

COAXIAL WIRED BROADCASTING SYSTEM WITH TONE RESPONSIVE PROGRAM SELECTORS

This application is a continuation-in-part of U.S. Ser. No. 557,911 filed Mar. 13, 1975, now abandoned.

The present invention relates to wired broadcasting systems.

According to the present invention, there is provided a wired broadcasting system comprising a wideband coaxial cable for carrying multi-channel programme signals from a programme source or programme sources to a plurality of exchanges to each of which a plurality of subscriber units are connected, the programme source or sources being arranged to apply the signals to the cable stacked one upon the other in frequency known otherwise in the art as frequency divisionmultiplexing when each signal has a distinctive frequency band channel, and each exchange comprising in respect of each subscriber a switchable frequency translator for selectively translating any one of the said stacked frequency signals to a predetermined other frequency which the subscriber unit is adapted to receive, switching means controllable from the respective subscriber unit to selectively switch the frequency translator, and an output circuit arranged to apply the said predetermined other frequency signal to a feeder cable to which the subscriber is connected.

Each of the subscribers may be connected to the respective exchange by a separate cable in which case the said other frequency may be exactly the same for each subscriber, or may be held in some other precise relationship to obtain optimum crossview protection on multi-pair twisted cables. This is a particularly advantageous arrangement for a system where HF amplitude modulated signals are sent from exchanges. Alternatively, the subscribers may be connected to their respective exchange by a common cable, in which case the said other frequency is different for each subscriber.

The switching means located at the exchange may be controlled by tones from a selector unit at the subscriber unit. The selector unit may comprise harmonic and divider generators locked to a master pilot tone or tones provided to the subscriber from the exchange.

If it is desired to prevent a subscriber from selecting a particular programme or programmes, means may be provided to prevent the one or more than one of the master pilot tones reaching the subscriber, thereby disabling one or more than one of the harmonic and divider generators and making it impossible for the subscriber to provide the necessary selection tone or tones to select the programme or programmes.

Figure 2:
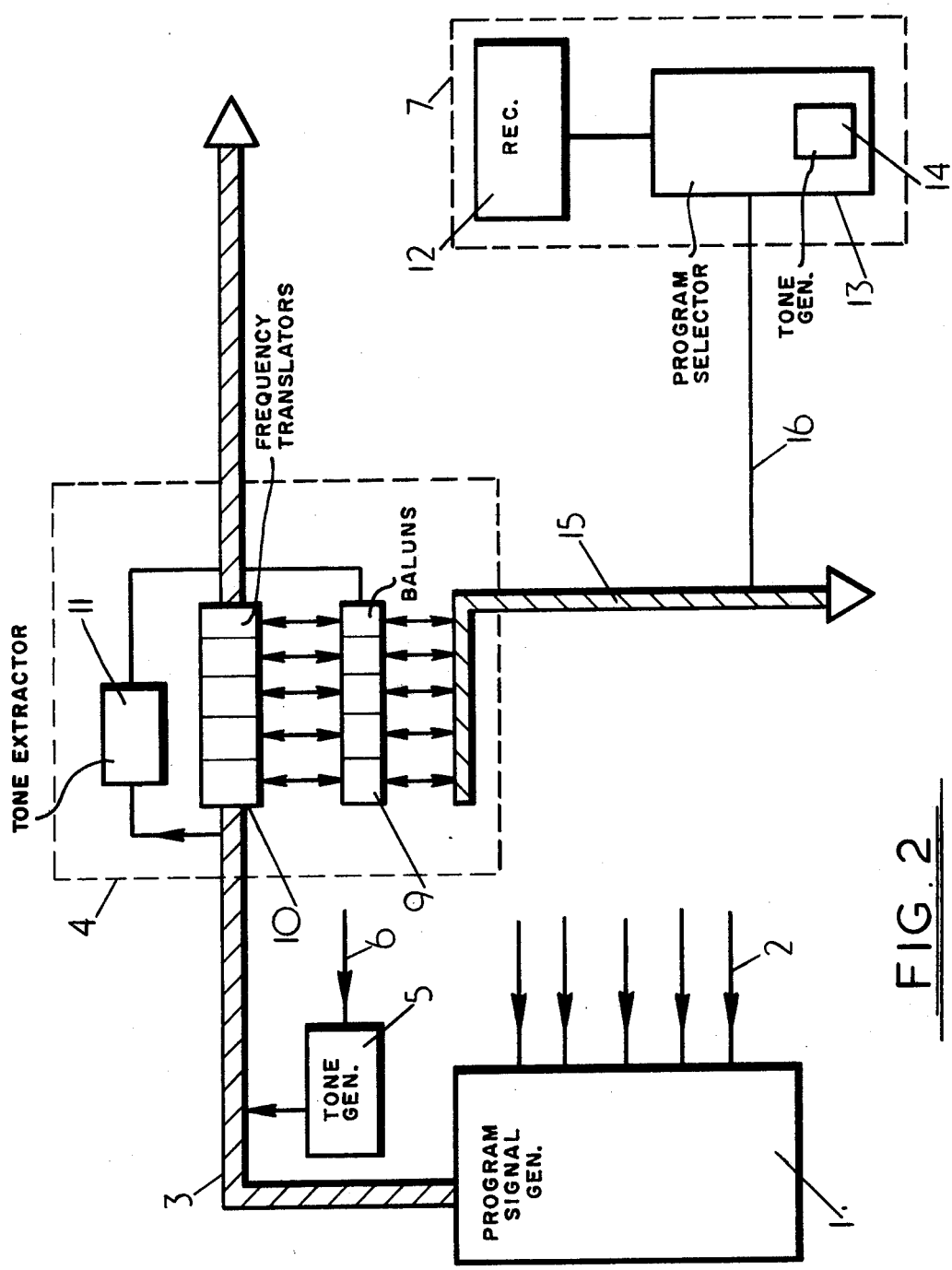
Figure 3:
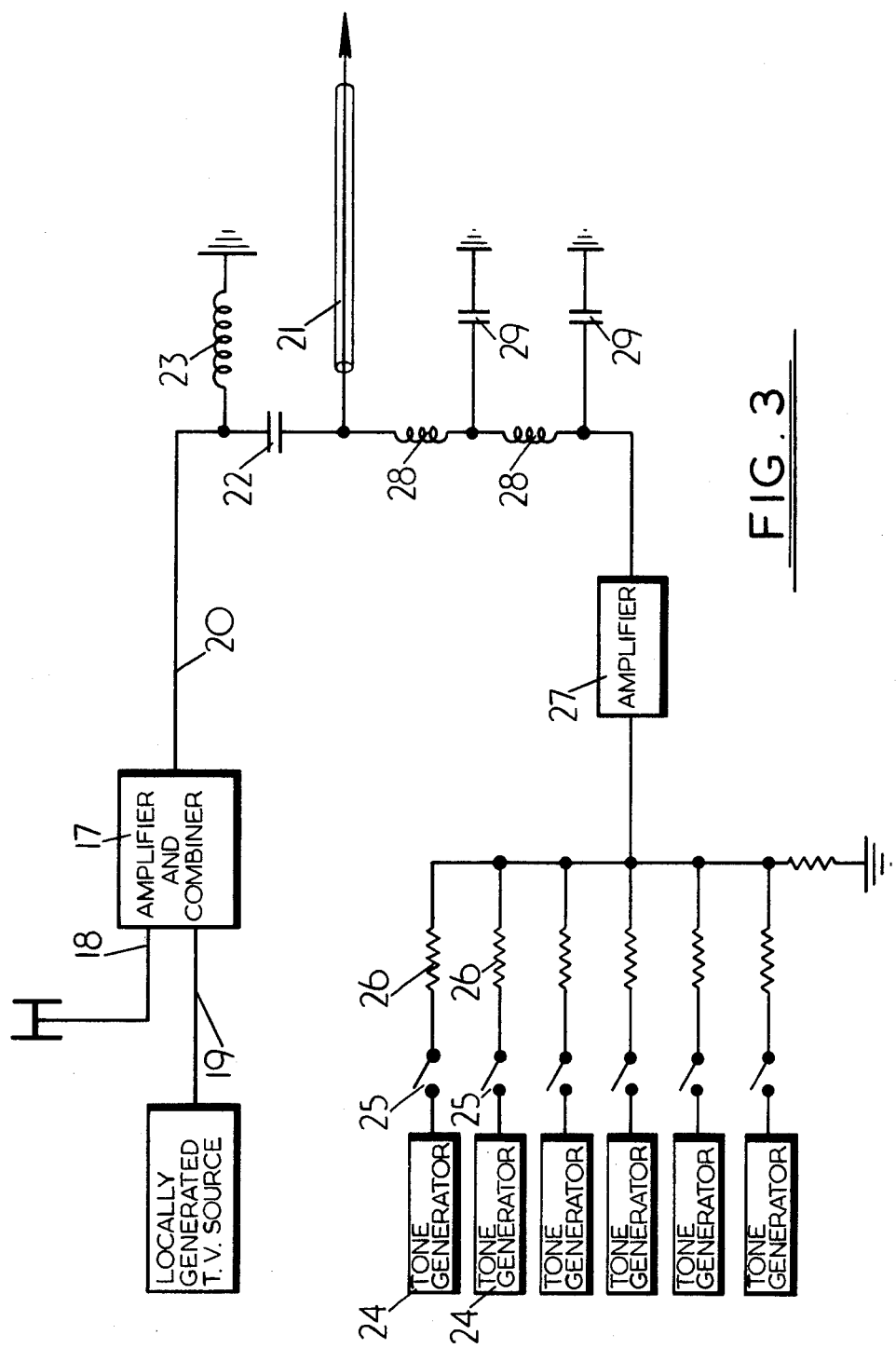
Figure 4:
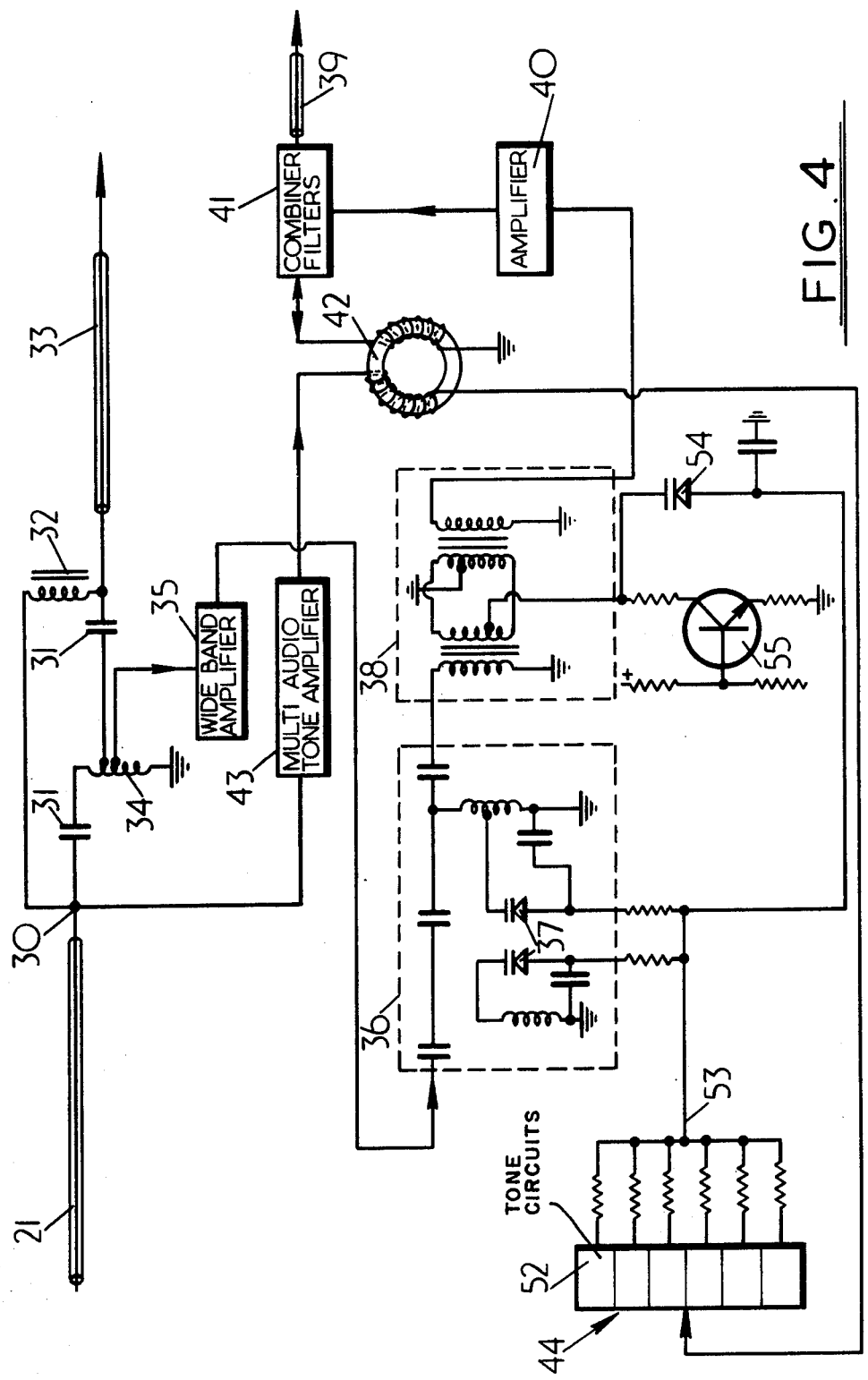

Embodiments of the present invention will now be described, by way of example, with reference to the accompanying drawings; in which:

FIG. 1 schematically illustrates an embodiment of the invention in which a plurality of subscribers are linked to an exchange by separate respective cables;

FIG. 2 schematically illustrates a further embodiment of the invention in which a plurality of subscribers are linked to an exchange by a common cable; and FIGS. 3, 4 and 5 illustrate details of a system similar to that of FIG. 1.

Referring to FIG. 1, a programme carrier signal generator 1 which comprises master frequency generators and F.M. modulators is provided with sound and vision programme signals on inputs 2. The signal generator 1 transmits programme signals on low deviation frequency modulated carriers stacked one upon the other in frequency to a wide band coaxial cable 3 which is in turn connected to a plurality of exchanges 4 only one of which is shown. Low deviation F.M. carriers are used as this reduces the problem of intermodulation distortion in frequency translators and permits adjacent channel selection after translation to a lower frequency band. Alternatively where the problem of intermodulation distortion may be reduced by controlled frequency band filtering the programme carrier signal generator may include standard VHF and UHF modulators. The cable 3 may have a bandwidth of for example 600 MHz. A tone generator unit 5 controlled by an input 6 is located between the signal generator 1 and the cable 3 and arranged to provide to the cable 3 one or more master pilot tones.

Each exchange 4 is connected to a plurality of subscriber units 7 (only one of which is shown) by respective one of a plurality of two or four wire "Qwist" cables 8 such as are described in our British Patent Specification No. 1,272,594. Each subscribers cable 8 is connected to a respective one of a series of baluns linked to a respective one of a series of frequency translators 10 arranged to translate the carrier frequencies to a frequency acceptable to the subscribers unit. A tone extractor and control unit 11 is arranged to extrace the master pilot tone or tones provided by the unit 5 and apply them to the baluns 9.

Each subscriber unit comprises a receiver 12 adapted to receive the HF or FM signals and a programme selector 13 which may comprise a bank of push buttons 14, actuation of which provides one or more selection tones to the exchange along the respective cable 8. The selection tones or frequencies are generated by harmonic and divider generators locked to the master pilot tone or tones sent from the baluns 9 in the exchange 4 along either of the pairs of wires in the cable 8.

When a subscriber wishes to receive a particular programme, he presses an appropriate push-button generating the required tone which identifies the frequency channel in the cable 3 on which that programme is provided. The frequency translator and balun system of the subscriber is arranged so that, on receipt of any one tone or combination of tones, the frequency of the signal associated with that tone or tones is translated from the band occupied on the coaxial cable 3 to the low frequency band required by the subscribers unit 7.

Where only one master tone is provided on the link 3 by the unit 5, the subscriber can be denied all the programmes on the line by preventing the master tone being transmitted to him from the exchange via tone extractor and control unit 11, the absence of the master tone disabling the selector 13. Where more than one master tone is provided, particular programmes or groups of programmes can be denied to a subscriber whilst other programmes or groups of programmes are supplied, by preventing the transmission of selected ones of the master tones from the exchange to the subscriber. This selective denial facility may be useful in systems where for example payment for some but not all of the programmes is required, or where access to particular programmes has to be limited for security reasons.

Where the tones are associated with programmes for which additional payment is required the corresponding tone generator may be inhibited until the subscriber takes some action to indicate that he has paid or is prepared to accept payment for receiving the programme. Alternatively selection of a "pay" programme may automatically indicate that payment is accepted. In one application all tone extractor and control units 11 may be under the control of a central pay TV computer and the computer may generate signals such as digital information over the link 3 or a secondary connection.

Referring now to FIG. 2, an alternative arrangement is shown in which the individual cables 8 of FIG. 1 are replaced by a wide band coaxial cable 15 common to all of the subscribers connected to a particular exchange 4. Corresponding components of the FIG. 1 and FIG. 2 embodiments are given corresponding reference numerals.

Each subscriber is linked by a subsidiary coaxial cable 16 to the main cable 15, and is allocated a particular frequency band in the cables 15 and 16. Subscribers near to the exchange are allocated high frequency bands and subscribers remote from the exchange are allocated low frequency bands to obtain a maximum reach for exchanges at a given sending level.

The exchange 4 is similar to that described with reference to FIG. 1 but includes in respect of each subscriber a characteristic frequency generator to provide selected programme signals on an F.M. carrier. VHF or UHF standard waveforms could alternatively be provided. The subscriber unit is also similar to that described with reference to FIG. 1, but additionally includes a frequency translator or changer for translating the characteristic carrier to a frequency acceptable to the subscribers receiver 12, and a characteristic selection tone generator 14, the exchange being arranged on receipt of the characteristic selection tone to allocate the frequency of a selected programme signal to a band dedicated to the particular subscriber. The local oscillators of the subscribers frequency translator may be controlled by pilot signals sent from the exchange to increase the security of the system. Alternatively or in addition this translator can be located outside the subscribers premises, for example on the pole route outside the premises, or at the end of the road in which the premises are located.

FIGS. 3, 4 and 5 illustrate details of a system similar to that described generally with reference to FIG. 1.

Referring to FIG. 3, a wideband amplifier and combiner 17 of a standard type such as is used in known CATV systems receives off-air TV signals on input 18 and locally generated TV signals on input 19. The amplifier and combiner 17 provides an FDM (frequency division multiplexing) output 20 in which each channel has a discrete frequency band. The channel frequency bands are thus stacked one upon the other in frequency in the range for example of 60 MHz to 300 MHz. The output 20 is applied to a coaxial trunk cable 21 via a high pass filter formed by a capacitor 22 and inductance 23.

Any one of a series of tone generators 24 may be connected via respective switches 25, resistors 26, an audio amlifier 27, and a low pass filter formed by inductances 28 and capacitors 29 to the cable 21. The filters formed by components 22, 23 and 28, 29 together form a signal combiner. The tone generators 24 may be for example Motorola K1040A or K1400A Series Tone Modules. Each of these Motorola units can provide one standard tone frequency in the range 67 Hz to 3250 Hz. The tone generators provide sine-wave outputs.

Referring to FIG. 4, an exchange installation is illustrated. The coaxial trunk cable 21 carry the combined FDM programme signal and the tones provided by generators 24 are applied to terminal 30. The FDM signals and the tones are respectively passed via audio blocking capacitors 31 and audio bypass choke 32 to a further coaxial trunk cable 33 which connects to a further exchange (not shown).

A wide band (autotransformer) "tap off" circuit 34 applies the FDM signals to a wide band amplifier 35 which in turn provides an input to a varactor controlled T.V. channel bandpass filter 36 comprising varicaps 37. The filter 36 applies a single one of the frequencies present in the FDM signals to a frequency changer 38 which changes the frequency of the signal passed by the filter 36 to a frequency suitable for application to a subscriber's feeder cable 39 via amplifier 40 and combiner filters 41. The operation of the filter 36 and the frequency changer 38 is controlled by the subscriber connected to the cable 39 in a manner described hereinafter.

The audio tones appearing at terminal 30 are applied to a balun 42 by a tone amplifier 43. The tones are applied to circuits 44 which will be described hereinafter and are arranged not to respond to any of the tones provided by generators 24 (FIG. 3). The tones are also applied to the subscribers cable 39 via combiner filters 41. The combiner filters 41 may be of the same construction as the combiner formed by components 22, 23, 28 and 29 of FIG. 3 and may comprise further switchable filters as described hereafter. Thus all the tones appearing at the terminal 30 and a single programme signal selected by filter 36 and frequency changed by changer 38 are passed to the individual subscriber connected to cable 39.

It will be appreciated that the exchange will be arranged to serve a number of subscribers and for this purpose an exchange bus-bar system (not shown) is powered by the outputs of amplifiers 35 and 43 rather than merely a single subscribers equipment.

Referring now to FIG. 5, a subscribers terminal equipment is illustrated which is connected to the cable 39 extending from the exchange. The single programme signal present on cable 39 is applied to a subscribers television receiver (not shown) connected to a line 45 via an audio tone blocking capacitor 46. The tones are passed via an HF choke 47 to a directional coupler 48 and thence to an array of electromagnetic resonators 49. The resonators are each responsive to one of the tones applied to the system. Each resonator 49 may be a Motorola K1000A or K1026A Vibrasponder, the K1000A covering the frequency range of from 67 Hz to 3225.8 Hz and the K1026A covering the frequency range of from 67 Hz to 1320 Hz. These Motorola components resonate when a particular tone is applied to them and when resonating produce a sine wave output of the same frequency as the input there to.

As all the tones applied to the system are supplied to the resonators 49, each will resonate. The subscriber may press any one of a series of switches 50 to apply the output of a selected resonator 49 to a third harmonic generator 51 the output of which is returned to the exchange via the directional coupler 48 and cable 39. The tones applied to the system and their third harmonics are distinct in frequency.

Referring again to FIG. 4, the output of the third harmonic generator 51 passes via combiner filters 41 and balun 42 to the circuits 44 which comprise a series of electro-magnetic resonators 52 such as resonators 49 described with reference to FIG. 5. Each resonator 52 is responsive to the third harmonic of one of the tones applied to the system but not to any of the tones themselves. The output 53 from the circuits 44 carries a voltage level the amplitude of which depends on the response of the resonators 52. The output 53 controls the varicaps 37 to adjust the pass band of the filter 36 to pass a single programme signal which corresponds to the selection made by actuation of the switch 50 (FIG. 5) by the subscriber. The frequency changer 38 is controlled by a varicap 54 which varies the biasing of a transistor 55 is dependance upon the output 53 to ensure that the selected programme signal is changed in frequency to the single frequency to which the subscribers equipment is tuned.

In circumstances where it is desired to prevent a subscriber receiving any or particular programmes means could be provided to prevent selected tones from being applied to the subscribers cable 39. To achieve this one or more further filters are added to the combiner 41 at the exchange, the filters being switchable to either pass or block one or more of the tones applied to the combiner filter 41 by the balun 42.

What is claimed is:

1. A wired broadcasting system comprising a wideband coaxial cable for carrying multi-channel programme signals from at least one programme source to a plurality of exchangers to each of which plurality of subscriber units for receiving a particular frequency band are connected, the said at least one programme source being constructed to supply the signals to the cable in different frequency channels, and each exchange comprising for each subscriber a switchable frequency translator for selectively translating any one of the said frequency bands to a predetermined other frequency band receivable by the subscriber unit, switching means controllable from the respective subscriber unit to selectively switch the frequency translator, and an output circuit constructed to supply the said predetermined other frequency signal to a feeder cable to which the subscriber is connected, a selector unit at each subscriber unit for generating control tones, wherein said switching means located at the exchange is responsive to said tones, a tone generator unit constructed to provide at least one master pilot tone to the said wide band coaxial cable, and a tone extractor unit at each exchange constructed to extract the said at least one master pilot tone from the said wideband coaxial cable for application to each subscriber unit connected to the exchange, the selector unit comprising tone generators responsive to the said at least one master pilot tone.

2. A wired broadcasting system according to claim 1, comprising selective transmission means at each exchange for preventing the said at least one master pilot tone from reaching the subscriber tone generators.

3. A wired broadcasting system according to claim 1, wherein each exchange has a band pass filter for selecting a single programme signal and each exchange has a frequency changer for each subscriber station for translating the frequency of the selected programme to a frequency acceptable to the subscriber's receiver wherein each subscribers band pass filter and frequency changer are controlled by tone signals from the subscriber.

4. A wired broadcasting system according to claim 3, wherein the band pass filter and frequency changer comprise varicaps controlled by the outputs of a series of resonators, the resonators being responsive to tones generated by the subscriber.

5. A wired broadcasting system according to claim 4, wherein the subscriber is provided with resonators responsive to tones applied to the system and switches for applying the output of any one resonator to a third harmonic generator, the output of the third harmonic generator providing said tones generated by the subscriber.

* * * * *